(12) United States Patent
Gross et al.

(10) Patent No.: US 7,801,700 B2
(45) Date of Patent: Sep. 21, 2010

(54) SIMULATING A VIBRATION PATTERN IN A COMPUTER SUBSYSTEM

(75) Inventors: Kenny C. Gross, San Diego, CA (US);
Anton A. Bougaev, La Jolla, CA (US);
Aleksey M. Urmanov, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 115 days.

(21) Appl. No.: 12/186,380

(22) Filed: Aug. 5, 2008

(65) Prior Publication Data

US 2010/0036620 A1 Feb. 11, 2010

(51) Int. Cl.
*G06F 19/00* (2006.01)

(52) U.S. Cl. .............. 702/182; 702/127; 702/141; 702/150; 702/151; 702/152; 702/153; 702/155; 702/158; 702/179; 702/180; 702/33; 702/34; 702/35; 702/36; 702/56; 702/57; 702/58; 702/59; 702/81; 702/84; 702/85; 702/94; 702/95; 73/1.75; 73/1.79; 73/1.82; 73/570; 73/649; 73/660; 73/664; 73/1.01; 73/1.37; 73/488; 73/490; 73/496; 73/577; 714/1; 714/25; 714/47; 714/48; 700/1; 700/21; 700/63; 700/64; 700/108; 700/109; 700/110; 700/275; 700/280

(58) Field of Classification Search .............. 702/127, 702/141, 150–153, 155, 158, 179–180, 33–36, 702/56–59, 81, 84, 85, 94, 95; 73/1.75, 1.79, 73/1.82, 570, 649, 660, 664, 1.01, 1.37, 488, 73/490, 496, 577; 714/1, 25, 47, 48; 700/1, 700/21, 63, 64, 108–110, 275, 280
See application file for complete search history.

(56) References Cited

U.S. PATENT DOCUMENTS

2002/0038188 A1* 3/2002 Fioravanti .................... 702/75

* cited by examiner

*Primary Examiner*—Sujoy K Kundu
(74) *Attorney, Agent, or Firm*—Park, Vaughan & Fleming LLP

(57) ABSTRACT

Some embodiments of the present invention provide a system that generates a simulated vibration pattern in a computer subsystem. During operation, a vibration pattern is monitored at a location in the computer subsystem, wherein the vibration pattern is monitored while the computer subsystem is incorporated into the computer system and the computer system is operating. Then, the vibrations of the computer subsystem are mimicked by generating the simulated vibration pattern at the same location in the computer subsystem based on the monitored vibration pattern.

18 Claims, 4 Drawing Sheets

SIMULATING A VIBRATION PATTERN IN A COMPUTER SUBSYSTEM

BACKGROUND

1. Field

The present invention relates to techniques for testing computer systems. More specifically, the present invention relates to a method and apparatus for simulating a vibration pattern in a computer subsystem for testing purposes.

2. Related Art

Performance problems related to vibrations in computer systems can sometimes be very difficult to diagnose due to difficulties in reproducing the vibrational environment inside a computer system during system operation. A number of devices in a computer system may generate vibrations that interact with internal structures and resonances in the computer system to produce vibration patterns in a computer system. Additionally, external sources of vibration at a computer installation site may also impact the performance of a computer system, and may be very difficult to identify and reproduce.

Hence, what is needed is a method and system that generates a simulated vibration pattern in a computer subsystem, without the above-described problems.

SUMMARY

Some embodiments of the present invention provide a system that generates a simulated vibration pattern in a computer subsystem. During operation, a vibration pattern is monitored at a location in the computer subsystem, wherein the vibration pattern is monitored while the computer subsystem is incorporated into the computer system and the computer system is operating. Then, the vibrations of the computer subsystem are mimicked by generating the simulated vibration pattern at the same location in the computer subsystem based on the monitored vibration pattern.

In some embodiments, generating the simulated vibration pattern includes generating a frequency domain representation of the monitored vibration pattern, selecting a set of frequencies from the frequency domain representation of the monitored vibration pattern, and generating the simulated vibration pattern based on the selected set of frequencies.

In some embodiments, the set of frequencies includes at least four frequencies.

Some embodiments additionally store information related to the vibration pattern. In these embodiments, generating the simulated vibration pattern includes retrieving the stored information, and generating the simulated vibration pattern based on the retrieved information.

In some embodiments, generating the simulated vibration pattern at the location in the computer subsystem includes generating the simulated vibration using a device with substantially the same form factor and mass distribution as a computer system component.

In some embodiments, the location in the computer system includes a field replaceable unit (FRU) slot.

In some embodiments, the location in the computer system includes a disk drive slot.

In some embodiments, monitoring the vibration pattern at the location in the computer subsystem includes monitoring a first acceleration of a first point in the location, a second acceleration of a second point in the location, a third acceleration of a third point in the location and a fourth acceleration of a fourth point in the location, wherein the first point, the second point, the third point, and the fourth point are situated at vertices of a tetrahedron.

In some embodiments, the simulated vibration pattern is generated at the location in the computer subsystem while the computer subsystem is located outside of the computer system.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1A:
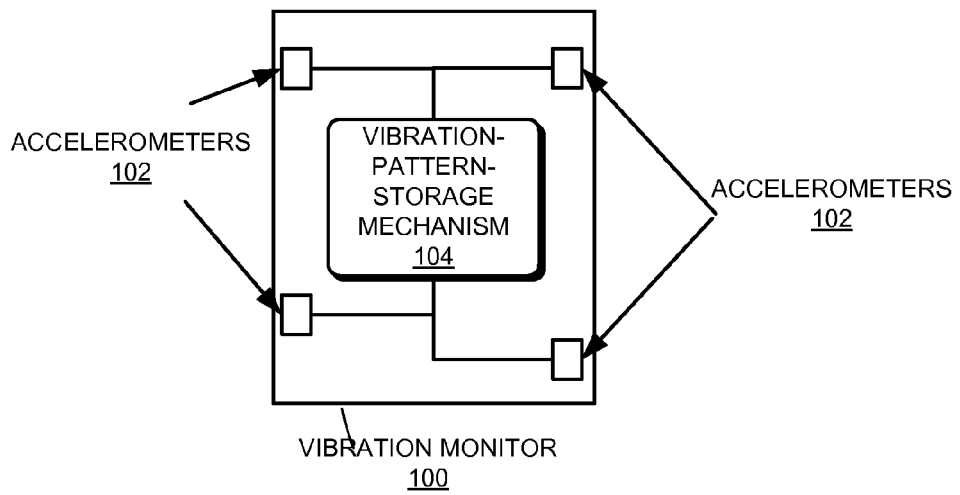
FIG. 1A illustrates a vibration monitor, with substantially the same form factor as a disk drive, that monitors a vibration pattern at a location in a computer subsystem in a computer system in accordance with some embodiments of the present invention.

FIG. 1A illustrates a vibration monitor, with substantially the same form factor as a disk drive, that monitors a vibration pattern at a location in a computer subsystem in a computer system in accordance with some embodiments of the present invention. Vibration monitor 100 includes accelerometers 102 coupled to vibration-pattern-storage mechanism 104. Vibration monitor 100 is configured to have substantially the same mass, mass distribution, and form factor as a disk drive so that the monitored vibration pattern is not substantially affected by the replacement of a disk drive with vibration monitor 100.

Accelerometers 102 can be any type of acceleration-measuring device including but not limited to integrated electronics piezoelectric accelerometers, micro-electromechanical systems (MEMS) accelerometers, mechanical or optical accelerometers, remote sensing devices, or any other device or system that can measure acceleration of a specified location. In some embodiments, accelerometers 102 are 3-axis accelerometers that measure acceleration in three orthogonal directions. Accelerometers 102 are placed in vibration monitor 100 on the vertices of a known tetrahedron so that the spatial relationship between the locations of accelerometers 102 is known, and such that all four of accelerometers 102 are not in the same plane and no three of accelerometers 102 form a straight line. In some embodiments, in which vibrations in a predetermined plane are to be measured, three 2-axis accelerometers are used and their axes are placed parallel to the vibration plane to be measured.

Vibration-pattern-storage mechanism 104 is coupled to accelerometers 102 and can be implemented in any technology and any combination of hardware and software. In some embodiments, vibration-pattern-storage mechanism 104 includes a processor. In some embodiments, vibration-pattern-storage mechanism 104 operates on a computer system that vibration monitor 100 is being used in or on a separate computer system. In some embodiments, vibration monitor 100 includes a wired or wireless communication mechanism that communicates information related to the acceleration measurement of accelerometers 102 to a vibration pattern storage mechanism located outside of vibration monitor 100.

In some embodiments, vibration monitor 100 includes a mechanism that turns on and off vibration-pattern-storage mechanism 104 and/or accelerometers 102. In some embodiments, vibration-pattern-storage mechanism 104 and/or accelerometers 102 are turned on remotely through a wired or wireless connection, or a connection to the internet that can include a connection through a computer system in which vibration monitor 100 is placed. In some embodiments, vibration-pattern-storage mechanism 104 and/or accelerometers 102 are turned on and off based on predetermined factors that can include but are not limited to one or more of: a time of day; a date; a state of the computer system; or any other event or circumstance. In some embodiments, vibration-pattern-storage mechanism 104 can be turned on or off based on vibrations, vibration patterns, accelerations or acceleration patterns detected by one or more of accelerometers 102. For example, in some embodiments, vibration-pattern-storage mechanism 104 is remotely commanded to turn on when a disk drive write rate exceeds a predetermined level and when the write rate falls below another predetermined level. As another example, in some embodiments, vibration storage mechanism only stores vibration patterns that have not previously been detected.

During operation of vibration monitor 100, vibration-pattern-storage mechanism 104 stores information related to the accelerations monitored by each of accelerometers 102. In some embodiments, vibration-pattern-storage mechanism 104 processes the information received from accelerometers 102 and determines the vibration patterns of vibration monitor 100 based on the accelerations measured by each of accelerometers 102. In some embodiments, vibration-pattern-storage mechanism 104 further processes the information by transforming it to the frequency domain. In some embodiments, transforming the vibration information from the time domain to the frequency domain involves using a fast Fourier transform (FFT). In other embodiments, other transform functions can be used, including, but not limited to, a Laplace transform, a discrete Fourier transform, a Z-transform, and any other transform technique now known or later developed. In some embodiments, vibration-pattern-storage mechanism 104 further processes the frequency domain representation of the vibration pattern and selects a set of vibration frequencies from the frequency domain representation. In some embodiments, at least four frequencies are selected. In some embodiments, the selected set of frequencies are selected based on factors including, but not limited to, one or more of the following: peak amplitude; or resonances of, or other known frequencies or frequency ranges of interest for one or more components of, a computer subsystem or the computer system.

Figure 1B:
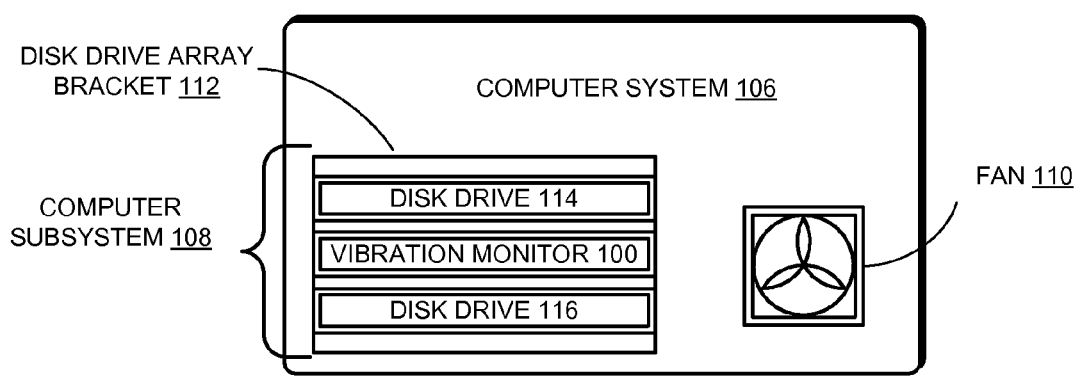
FIG. 1B illustrates a computer system, including a vibration monitor, that monitors a vibration pattern at a location in a computer subsystem in a computer system in accordance with some embodiments of the present invention.

FIG. 1B illustrates a computer system including vibration monitor 100 that monitors a vibration pattern at a location in a computer subsystem in a computer system in accordance with some embodiments of the present invention. Computer system 106 includes computer subsystem 108 and fan 110. Computer subsystem 108 includes disk drive array bracket 112, disk drive 114, disk drive 116, and vibration monitor 100. Fan 110 can be any fan in a computer system including but not limited to a CPU cooling fan or a case fan.

During operation of computer system 106, vibrations are transmitted to vibration monitor 100. These vibrations include vibrations generated inside computer system 106 by one or more devices including but not limited to disk drive 114, disk drive 116, and fan 110, as well as vibrations generated outside of computer system 106 by outside sources. Vibration monitor 100 monitors vibrations as described above.

In some embodiments, vibration monitor 100 is configured to have substantially the same mass, mass distribution, and form factor as any device in a computer system, including but not limited to fan 110, or any device that can be inserted into a field replaceable unit (FRU) slot. In some embodiments, accelerometers and a vibration-pattern-storage mechanism are placed directly into a computer system and are not housed in a vibration monitor.

Figure 2A:
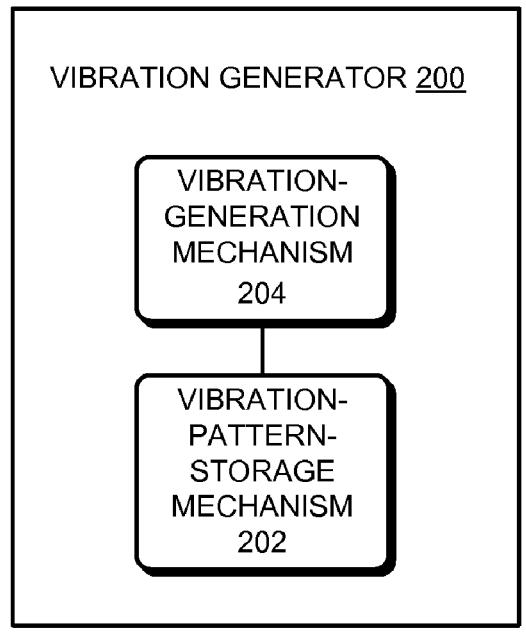
FIG. 2A illustrates a vibration generator, with substantially the same form factor as a disk drive, for mimicking a vibration pattern at a location in a computer subsystem in accordance with some embodiments of the present invention.

FIG. 2A illustrates a vibration generator, with substantially the same mass, mass distribution, and form factor as a disk drive, for mimicking a vibration pattern at a location in a computer subsystem in accordance with some embodiments of the present invention. Vibration generator 200 includes vibration-pattern-storage mechanism 202 coupled to vibration-generation mechanism 204. Vibration generator 200 is configured to have substantially the same mass, mass distribution, and form factor as a disk drive so that the generated vibration pattern is not substantially affected by the replacement of a disk drive with vibration generator 200.

Vibration-pattern-storage mechanism 202 stores vibration patterns that can be sent to vibration-generation mechanism 204 to produce vibrations based on the vibration patterns stored in vibration-pattern-storage mechanism 202. In some embodiments, vibration patterns stored in vibration-pattern storage mechanism 202 include vibration patterns monitored by vibration monitor 100. Vibration-pattern-storage mechanism 202 can be implemented in any combination of hardware and software. In some embodiments, vibration-pattern-storage mechanism 202 is implemented in hardware or a combination of hardware and software in a separate computer system. In some embodiments, vibration-pattern-storage mechanism 202 includes a wired or wireless communications mechanism, or a connection through the internet, to transfer information including vibration patterns to and from vibration generator 200, and enable or disable the generation of vibrations by vibration generator 200.

Vibration-generation mechanism 204 generates vibrations in response to signals from vibration-pattern-storage mechanism 202. Vibration-pattern-storage mechanism 202 can be implemented in any combination of hardware and software. In some embodiments vibration-pattern-storage mechanism 202 includes mechanisms for producing vibrations that are well-known in the art.

Figure 2B:
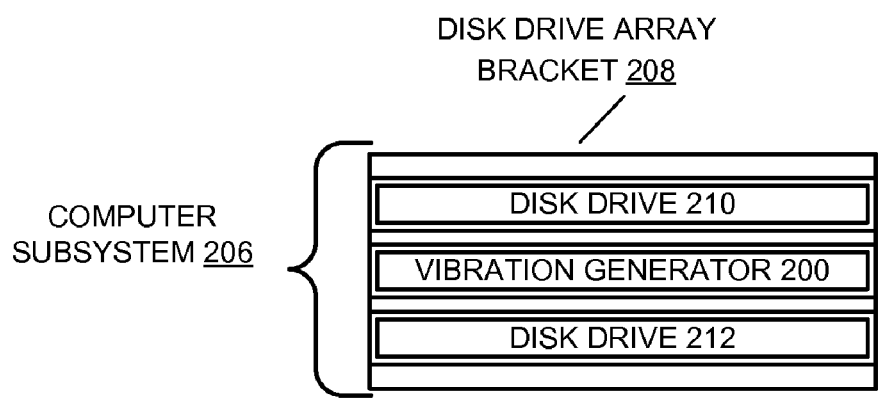
FIG. 2B illustrates a computer subsystem, including a vibration generator, that mimics a vibration pattern at a location in a computer subsystem in accordance with some embodiments of the present invention.

FIG. 2B illustrates a computer subsystem including vibration generator 200, that mimics a vibration pattern at a location in a computer subsystem, in accordance with some embodiments of the present invention. Computer subsystem 206 includes disk drive array bracket 208, disk drive 210, disk drive 212 and vibration generator 200. During operation, vibration-pattern-storage mechanism 202 sends a signal representing a vibration pattern to vibration-generation mechanism 204. Vibration-generation mechanism 204 then vibrates in response to the signal from vibration-pattern-storage mechanism 202, causing disk drive array bracket 208, disk drive 210, and disk drive 212 to vibrate. In some embodiments, computer subsystem 206 is located inside a computer system, while in other embodiments it is integrated into another computer subsystem that is not a complete computer system, while in still other embodiments it is not located in another subsystem.

In some embodiments, vibration monitor 100 includes vibration-generation mechanism 204 coupled to vibration-pattern-storage mechanism 104. In these embodiments, vibration monitor 100 can be used both to monitor vibration patterns as discussed above with reference to FIGS. 1A and 1B, and to generate vibration patterns as discussed above with reference to FIGS. 2A and 2B.

Figure 3A:
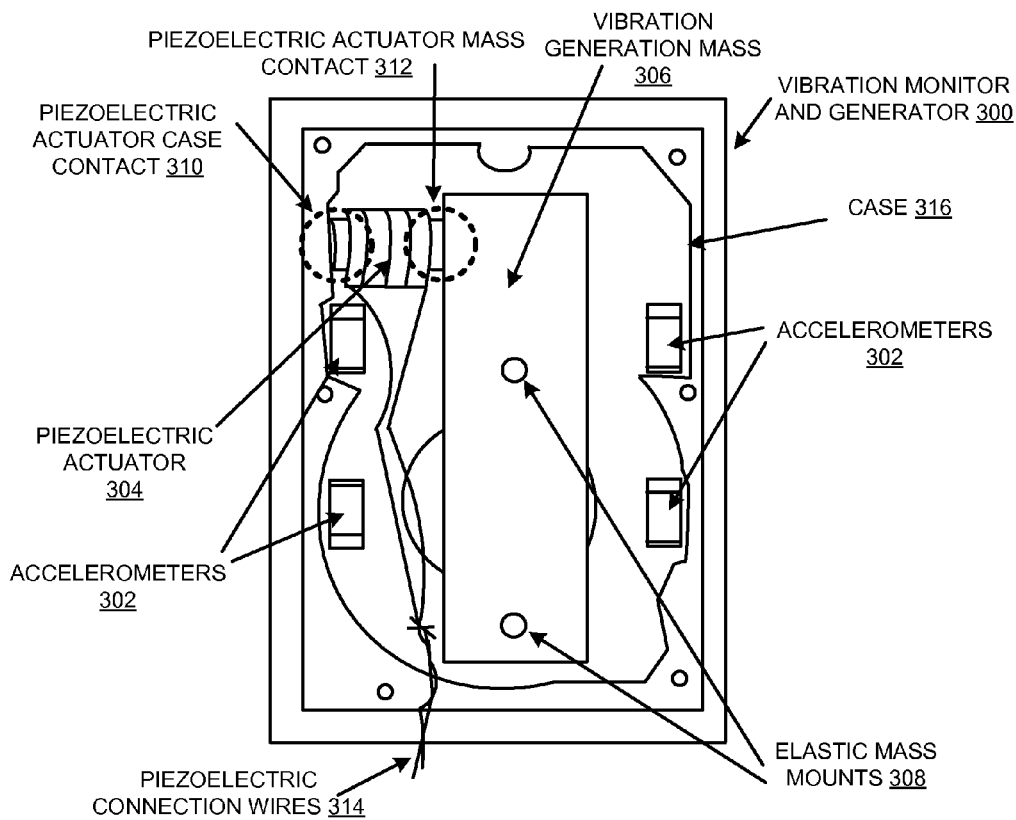
FIG. 3A is a picture of a vibration monitor and generator, with substantially the same form factor as a disk drive, for monitoring and mimicking a vibration pattern at a location in a computer subsystem in accordance with some embodiments of the present invention.

FIG. 3A is a picture of a vibration monitor and generator, in substantially the same form factor as a disk drive, for monitoring and mimicking a vibration pattern at a location in a computer subsystem in accordance with some embodiments of the present invention. Vibration monitor and generator 300 includes four accelerometers 302, piezoelectric actuator 304, vibration generation mass 306, elastic mass mounts 308, piezoelectric actuator case contact 310, piezoelectric actuator mass contact 312, piezoelectric connection wires 314, and case 316

Vibration monitor and generator 300 has substantially the same mass, mass distribution, and form factor as a disk drive. Accelerometers 302 are are placed in vibration monitor and generator 300 on the vertices of a known tetrahedron so that the spatial relationship between the locations of accelerometers 302 is known, and such that all four of accelerometers 302 are not in the same plane and no three of accelerometers 302 form a straight line. Accelerometers 302 are coupled to an external vibration-pattern-storage mechanism through wires that are not shown in FIG. 3A. Piezoelectric actuator 304 contacts vibration generation mass 306 at piezoelectric actuator mass contact 312 and contacts case 316 at piezoelectric actuator case contact 310. Vibration generation mass 306 is coupled to vibration monitor and generator 300 by elastic mass mounts 308. Piezoelectric actuator 304 is coupled to an amplifier and a vibration-pattern-storage mechanism (not shown) through piezoelectric connection wires 314.

Vibration monitor and generator 300 detects vibrations using signals generated by accelerometers 302 as described above with reference to the operation of vibration monitor 100. Moreover, vibration monitor and generator 300 generates vibrations as follows. Vibration patterns from a vibration-pattern-storage mechanism are first sent to an amplifier. The amplified signal drives piezoelectric actuator 304 through piezoelectric connection wires 314. Piezoelectric actuator 304 then causes vibration monitor and generator 300 to vibrate by pushing and pulling on vibration generation mass 306. In the embodiment depicted in FIG. 3A, vibration monitor and generator 300 generates vibrational motion in the plane of the figure.

Figure 3B:
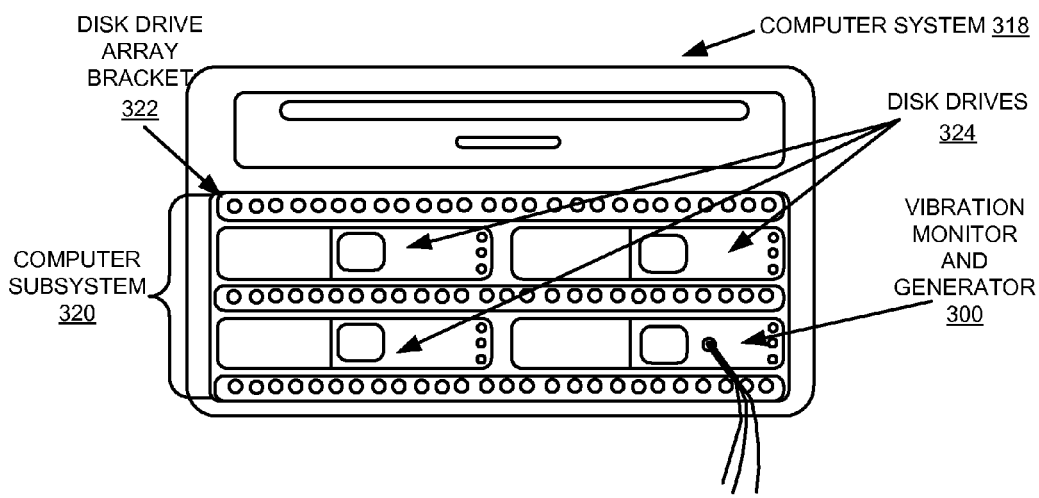
FIG. 3B is a picture of a portion of a computer system, including a computer system containing disk drives and a vibration monitor and generator, in accordance with some embodiments of the present invention.

FIG. 3B is a picture of a portion of a computer system including a computer subsystem containing disk drives and a vibration monitor and generator in accordance with some embodiments of the present invention. Computer system 318 includes computer subsystem 320. Computer subsystem 320 includes disk drive array bracket 322, disk drives 324 and vibration monitor and generator 300.

Some embodiments of the present invention work as follows. While computer system 318 is operating, vibration monitor and generator 300 monitors vibrations of computer system 300 that are detected by accelerometers 302. The accelerations monitored by accelerometers 302 are transmitted to a vibration-pattern-storage mechanism where they are converted to vibration patterns. The vibration patterns are Fourier transformed to the frequency domain and the four frequencies with the highest amplitudes are selected to be used by vibration monitor and generator 300 to simulate the monitored vibration pattern.

In some embodiments, vibration monitor and generator 300 then generates the simulated vibration pattern while it is in computer subsystem 320. In some embodiments, computer subsystem 320 is in computer system 318 while the simulated vibration patterns are generated, while in other embodiments computer subsystem 320 is not in computer system 318 while the simulated vibration patterns are generated. In some embodiments, parameters of disk drives 324, such as a read rate or write rate, are monitored while the simulated vibration pattern is generated.

Figure 4:
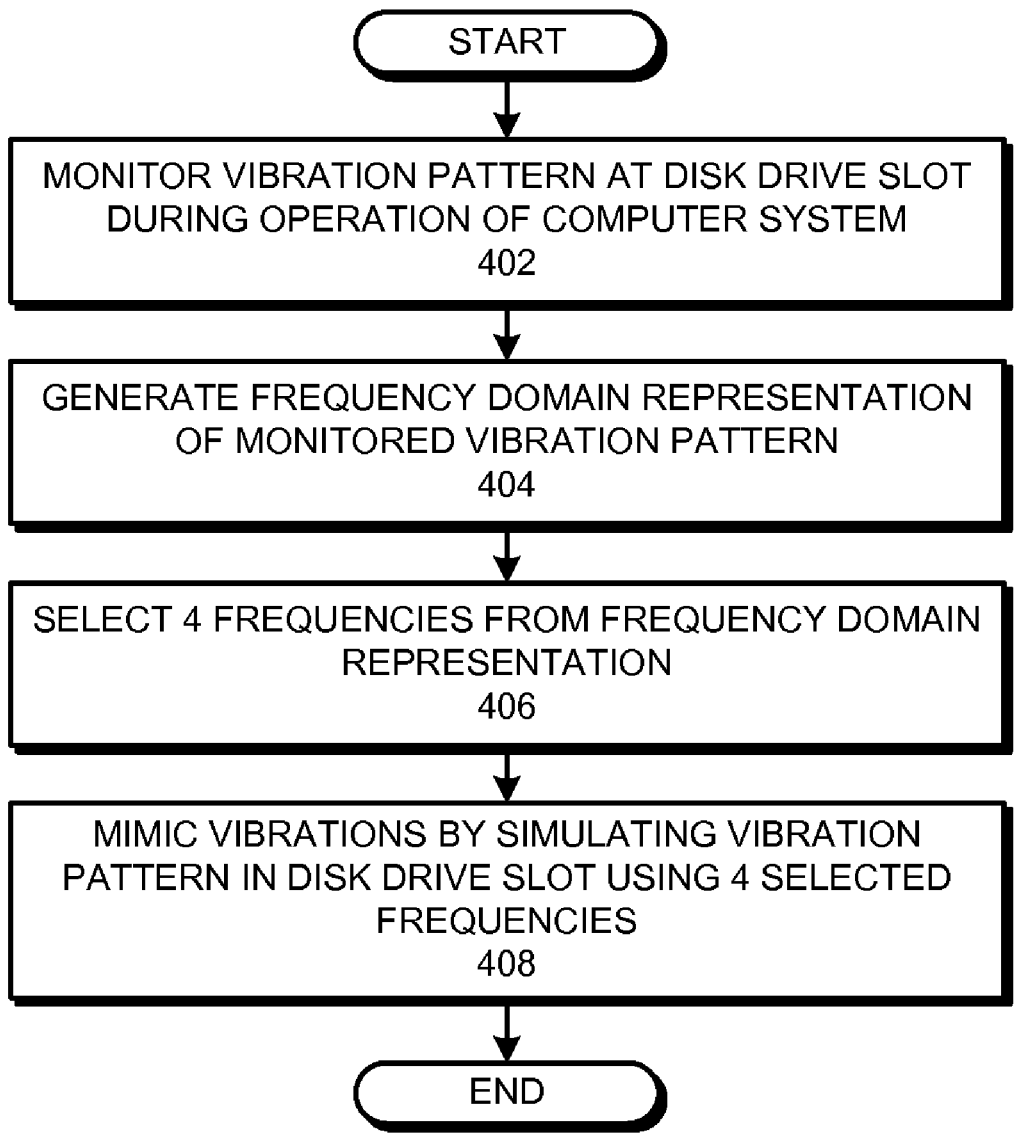
FIG. 4 presents a flowchart illustrating a process for generating a simulated vibration pattern in a computer subsystem in accordance with some embodiments of the present invention.

FIG. 4 presents a flowchart illustrating a process for generating a simulated vibration pattern in a computer subsystem in accordance with some embodiments of the present invention. The vibration pattern at a disk drive slot is monitored during operation of a computer system (step 402). Then a frequency domain representation of the monitored vibration pattern is generated (step 404). Next, the four frequencies are selected from the frequency domain representation of the monitored vibration pattern (step 406). In some embodiment more or fewer frequencies are selected from the frequency domain representation of the monitored vibration pattern. In some embodiments, the selected frequencies are selected based on factors including but not limited to one or more of the following: peak amplitude, or known resonant frequencies or other critical frequencies of the disk drives. Then, the vibrations are mimicked by simulating the vibration pattern in the disk drive slot using the four selected frequencies (step 408).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for generating a simulated vibration pattern in a computer subsystem, the method comprising:
   monitoring a vibration pattern at a location in the computer subsystem by monitoring an acceleration for each point in a set of points in the location, wherein the set of points includes four points situated at vertices of a tetrahedron; and
   generating vibrations, wherein generating the vibrations involves mimicking the vibrations of the computer subsystem by generating the simulated vibration pattern at the location in the computer subsystem based on the monitored vibration pattern;
   wherein the vibration pattern is monitored while the computer subsystem is incorporated into a computer system and the computer system is operating.

2. The method of claim 1, wherein generating the simulated vibration pattern includes:
   generating a frequency domain representation of the monitored vibration pattern;
   selecting a set of frequencies from the frequency domain representation of the monitored vibration pattern; and
   generating the simulated vibration pattern based on the set of frequencies.

3. The method of claim 2 wherein the set of frequencies includes at least four frequencies.

4. The method of claim 1, further including:
   storing information related to the vibration pattern; and
   wherein generating the simulated vibration pattern includes retrieving the stored information, and generating the simulated vibration pattern based on the retrieved information.

5. The method of claim 1, wherein:
   generating the simulated vibration pattern at the location in the computer subsystem includes generating the simulated vibration using a device with the same form factor and mass distribution as a computer system component.

6. The method of claim 1, wherein the location in the computer system includes a field replaceable unit (FRU) slot.

7. The method of claim 1, wherein the location in the computer system includes a disk drive slot.

8. The method of claim 1, wherein the simulated vibration pattern is generated at the location in the computer subsystem while the computer subsystem is located outside of the computer system.

9. A non-transitory computer-readable storage medium storing instructions that when executed by a computer cause the computer to perform a method for generating a simulated vibration pattern in a computer subsystem, the method comprising:
   monitoring a vibration pattern at a location in the computer subsystem by monitoring an acceleration for each point in a set of points in the location wherein the set of points includes four points situated at vertices of a tetrahedron; and
   mimicking the vibrations of the computer subsystem by generating the simulated vibration pattern at the location in the computer subsystem based on the monitored vibration pattern;
   wherein the vibration pattern is monitored while the computer subsystem is incorporated into a computer system and the computer system is operating.

10. The computer-readable storage medium of claim 9, wherein generating the simulated vibration pattern includes:
    generating a frequency domain representation of the monitored vibration pattern;
    selecting a set of frequencies from the frequency domain representation of the monitored vibration pattern; and
    generating the simulated vibration pattern based on the set of frequencies.

11. The computer-readable storage medium of claim 10 wherein the set of frequencies includes at least four frequencies.

12. The computer-readable storage medium of claim 9, further including:
    storing information related to the vibration pattern; and
    wherein generating the simulated vibration pattern includes retrieving the stored information, and generating the simulated vibration pattern based on the retrieved information.

13. The computer-readable storage medium of claim 9, wherein generating the simulated vibration pattern at the location in the computer subsystem includes generating the simulated vibration using a device with the same form factor and mass distribution as a computer system component.

14. The computer-readable storage medium of claim 9, wherein the location in the computer system includes a field replaceable unit (FRU) slot.

15. The computer-readable storage medium of claim 9, wherein the location in the computer system includes a disk drive slot.

16. The computer-readable storage medium of claim 9, wherein the simulated vibration pattern is generated at the location in the computer subsystem while the computer subsystem is located outside of the computer system.

17. An apparatus that generates a simulated vibration pattern in a computer subsystem, the apparatus comprising:
    a monitoring mechanism configured to monitor a vibration pattern at a location in the computer subsystem by monitoring an acceleration for each point in a set of points in the location, wherein the set of points includes four points situated at vertices of a tetrahedron, and wherein the location in the computer system includes a field replaceable unit (FRU) slot; and
    a vibration mimicking mechanism configured to mimic the vibrations of the computer subsystem by generating the simulated vibration pattern at the location in the computer subsystem based on the monitored vibration pattern, wherein the vibration mimicking mechanism has substantially the same form factor and mass distribution as a computer system component;
    wherein the vibration pattern is monitored while the computer subsystem is incorporated into the computer system and the computer system is operating.

18. The apparatus of claim 17, wherein:
    the vibration mimicking mechanism is further configured to generate the simulated vibration pattern based on a set of frequencies selected from a frequency domain representation of the monitored vibration pattern.

* * * * *